March 26, 1968
C. P. HOLLSTEIN, JR
3,375,457
DATA ACQUISITION AMPLIFIERS
Filed Jan. 22, 1965
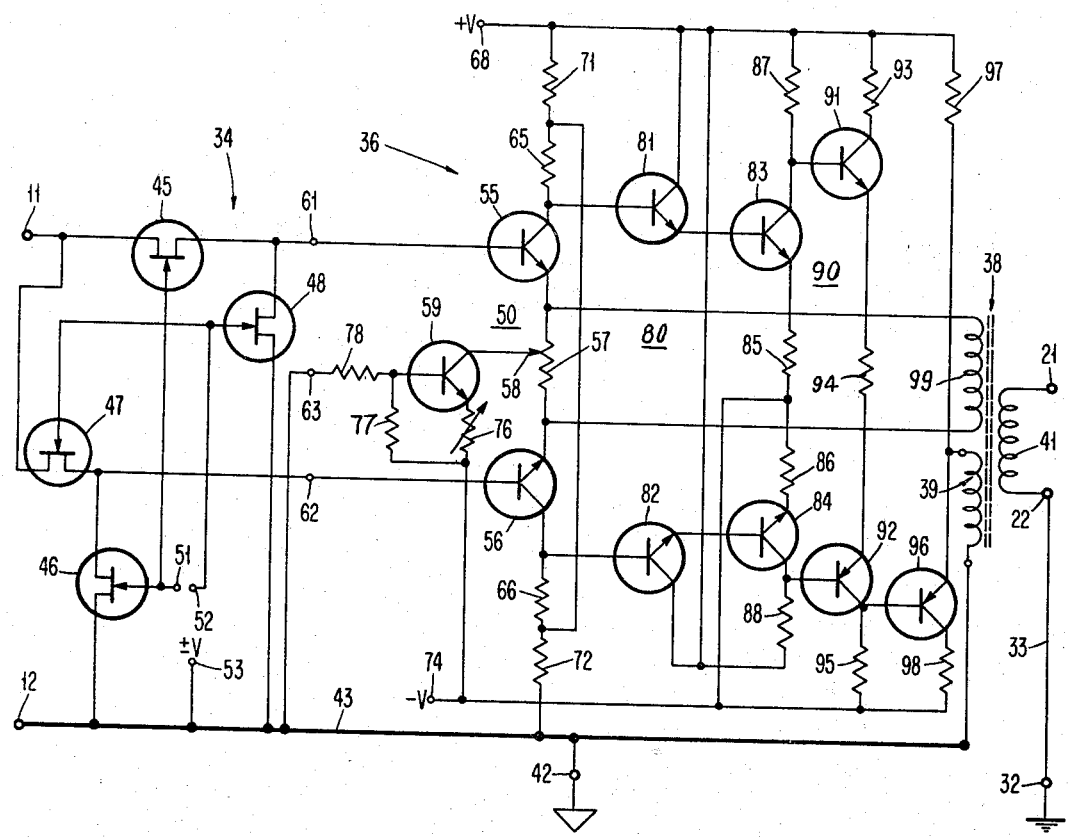
INVENTOR.
CARL P. HOLLSTEIN, Jr.
BY 
ATTORNEY United States Patent Office 3,375,457
Patented Mar. 26, 1968

3,375,457
DATA ACQUISITION AMPLIFIERS
Carl Paul Hollstein, Jr., Campbell, Calif., assignor to International Business Machines Corporation, New York, N.Y., a corporation of New York
Filed Jan. 22, 1965, Ser. No. 427,246
8 Claims. (Cl. 330—30)

ABSTRACT OF THE DISCLOSURE

Common mode voltage rejection and signal source isolation of a data acquisition differential amplifier are enhanced by a 4-transistor switch arrangement connecting the signal input terminals cyclically and alternately to the signal terminals of the amplifier. Two transistors are switched to connect the input terminals to the signal terminals in one phase of each cycle. The other two transistors are then switched to invert the connections between the signal terminals and the input terminals in the second phase of each cycle.

This arrangement permits one input terminal to be connected to ground or other point of reference potential. A continuous galvanic connection is afforded for reference potential leads.

The output stage of the amplifier comprises a pair of complementary connected transistors followed by a single emitter follower transistor coupled to the primary winding of an isolation transformer.

---

The invention relates to data acquisition amplifiers, and it particularly pertains to means for rejecting interfering common mode voltages and stabilizing the amplification of data signal voltages in such amplifiers.

Data acquisition amplifiers are not only subject to the general design problem of amplifiers, but also must be designed for producing a signal voltage across a pair of terminals, one of which is a reference terminal preferably connected to circuit ground, in response to a signal voltage existing between a plurality of conductors, which may be the terminals of a transducer, which conductors usually bear a common unknown and/or a variable extraneous voltage difference with respect to circuit ground.

It is well known in low voltage measurement work that even the potential along a single chassis ground can differ from point to point. This phenomenon is more apparent in systems extending over large areas, such as data measuring systems designed to sense operational characteristics of an extended manufacturing plant. Ground potential differences of several volts can be observed in such systems. Frequently, the full range of measurements being made is small, in the order of millivolts, but high accuracy, on the order of one part in ten thousand, is required. In such situations special problems arise that require special treatment as hereinafter described.

Ground loops in the transmission lines from the transducer to a measuring device in systems of the type under consideration seldom can be tolerated, and, therefore, the transducer most frequently is connected to the measuring system by separate isolated conductors.

The occurrence of changing electrostatic and electromagnetic fields and the practical impossibility of completely shielding the conductors makes it necessary that all conductors from the transducer to the measuring system be affected in the same way by stray electrostatic and electromagnetic fields. The voltage thus generated by stray electrostatic fields through the shielding therefore appears on all conductors in the same sense and amplitude; such voltages are termed common mode voltages.

Common mode voltage in actual data acquisition systems may be in the order of as much as a few hundred volts where the entire range of signal voltages, that is, the difference in voltage between the leads of a transducer will be less than ten millivolts in many cases. It is clear therefore that isolation is necessary between the input side of a measuring system and the indicating side.

The input signals to be handled by such a system will be direct or slowly varying voltages which require either direct coupled amplifiers and the like or modulation of the input voltage, with subsequent synchronous demodulation further on in the system, for easing the design requirements to the alternating voltage or current amplification.

It has been suggested that a differential amplifier be used as a single ended amplifier in a preamplifying section of a data acquisition amplifier having a ground or reference voltage terminal. But according to the prior art the common mode rejection of such an arrangement is still limited to the ratio of the leakage resistance between the floating ground and the system ground to the resistance in the amplifier ground lead between the terminals where the common mode voltage and signal voltage are in common and the floating ground lead of the amplifier. This resistance is often increased considerably in those situations in which at least one switching element of a chopper or full wave modulator is interposed in the input leads to the amplifier. Even the resistance of a field effect transistor in a solid state switching circuit will increase the common mode voltage effect on the circuits.

Data acquisition amplifiers quite frequently are stabilized by negative feedback from the output stage to the input. The known differential amplifier arrangements, however, do not take advantage of the erect and inverted voltage wave amplification.

Accordingly, an object of the invention is to provide circuitry in a data acquisition amplifier for electrically isolating with respect to circuit ground the conductors leading from a transducer to a pair of output terminals, one of which may be at circuit ground.

Another object of the invention is to provide a data acquisition amplifier for operation with floating inputs and grounded outputs having a high common mode rejection, high input impedance and low output impedance while providing virtually complete electrical isolation between the input and the output terminals.

Still another object of the invention is to provide a data acquisition amplifier in which a floating input signal is modulated at the input side of the device and then coupled to the output side by a transformer providing electrical isolation between the input and output sides, one terminal of the output winding of which may be grounded.

Still a further object of the invention is to provide a data acquisition amplifier having inverse feedback to the input active devices of a differential amplifier fully effective on voltage waves at both erect and inverted amplifying terminals.

Common mode voltage rejection and signal source isolation are both greatly improved in a data acquisition amplifier; comprising input terminals across which transducer and/or transmission line conductors are connected and output terminals, one of which is preferably connected to earthed circuit ground with a signal stabilizing modulator circuit, a differential preamplifying circuit and an isolating transformer connected in series between the input and the output terminals; according to the invention, by establishing a continuous galvanic electric connection of as low an impedance as possible between one of the input terminals and one terminal of the output transformer primary winding, which continuous connection serves as the point of reference potential for the amplifying circuit and is normally connected to chassis or floating ground.

Further according to the invention, the modulator circuit comprises four solid state switching devices, preferably field effect transistors, arranged to alternate the normal signal voltage to the balanced input terminals of the differential amplifier.

Still further according to the invention, the output transformer comprises a tertiary winding and the terminals of this winding are connected to the emitter electrodes of the balanced transistors of the input amplifying stage whereby full feedback potential is always supplied between the point of reference voltage, or floating ground, to which the base electrode of one transistor is connected and the emitter electrode of the other transistor.

Still further according to the invention, the primary winding of the transformer is connected to complementary connected output stage transistors of the differential amplifier by means of an emitter follower circuit comprising a single transistor providing an effective output substantially equal to a shunt fed center tapped transformer connection.

In order that the practical aspects of the invention may be readily attained in practice, an express embodiment thereof, presented by way of example only, is described hereinafter with reference to the accompanying drawing forming a part of the specification and in which:

The sole figure is a schematic diagram of a data acquisition amplifier according to the invention.

Normal mode signal voltage obtained by means of a suitable transducer and carried by the conductors of a transmission line (not shown) is applied between a pair of input terminals 11, 12, both of which are preferably isolated from circuit ground, or earthed ground, for eventual presentation at suitable amplitude at a pair of output terminals 21, 22, one of which may be and preferably is connected to circuit ground, or earthed ground. The normal mode signal voltage is translated by means of a switching circuit 34 through a differential amplifying circuit 36 to a transformer 38 having a primary winding 39 and a secondary winding 41. The terminals of the secondary winding 41 are connected to the output terminals 21 and 22, the latter of which is connected as shown to an earthed or circuit ground terminal 32 by means of a conductor 33.

The terminals 21 and 22 of the secondary winding 41 of the transformer 38 are always isolated from the point of reference potential for the circuit of the data acquisition amplifier represented by a floating ground terminal 42.

According to the invention the reference input terminal 12 is connected to the reference potential terminal 42 by means of a continuous galvanic conductor 43 to which one terminal 44 of the primary winding 39 is connected as well as other points of the switching circuit 34 and the amplifying circuit 36 for establishing reference potential therefor. In practice, it is preferred that the metal chassis on which the various components of the data acquisition amplifier of this invention are mounted is connected to the reference potential conductor 43 at a single point, although it is recognized that certain variations may be made as dictated by the circumstances.

The switching circuit 34 comprises four semiconductor switching devices, shown as field effect transistors 45, 46, 47 and 48, each having two contact electrodes and at least one control electrode. It should be clearly understood that double-based diodes, some unipotential transistors, double emitter transistors or other types of switching devices may be used by those skilled in the art in accordance with the desired characteristics and other considerations. The control electrodes of the switching transistors 45 and 46 are connected to a common control voltage terminal 51 and the control electrodes of the other transistors 47 and 48 are connected to a complementary control voltage terminal 52. A common terminal 53, connected to the conductor 43, is provided for a reference point in respect to the drive terminals 51 and 52.

The input stage 50 of the amplifying circuit 36 comprises a pair of base input connected transistors 55 and 56 having emitter electrodes connected to the terminals of a potentiometer resistance strip 57. Arm 58 of the potentiometer is connected to the point of reference potential on the conductor 43 either directly through a suitable resistor 78 and a bias voltage supply or by way of a bias voltage stabilizing circuit transistor 59 as shown. The base electrodes of the transistors 55 and 56 are connected to signal terminals 61 and 62 which are balanced with respect to the reference terminal 63. Load resistors 65 and 66 are individually connected to the collector electrodes of the transistors 55 and 56 which are energized from a source of positive direct voltage between terminals 68 and 53 either directly or through a voltage divider comprising resistors 71 and 72, as shown, the latter of which is connected to the reference ground potential conductor 43. A source of negative direct potential is applied between terminals 74 and 53, among other things, for biasing the common mode rejection transistor 59 through resistors 76, 77 and 78. An inter-stage amplifier section 80 has transistors 81 and 82 having the base electrode individually coupled to input stage transistors 55 and 56, essentially as emitter followers and coupled individually to the following transistors 83 and 84, where the biasing resistors 85 and 86 also serve as the emitter follower load resistors which are returned to the source of negative potential at the terminal 74. Load resistors 87 and 88 are individually connected to the output stage 90 having amplifying transistors 91 and 92 of opposite conductivity types arranged in a complementary circuit configuration through resistors 93, 94 and 95. The voltage developed across the load resistor 95 is applied to an emitter follower transistor 96 having a load resistor 97 developing an output voltage which is applied to the primary winding 39 of the transformer 38. The output voltage varies about the reference voltage level effectively balancing direct current out of the primary winding 39. Preferably, a resistor 98 of low resistance value is connected in the collector lead of the emitter follower transistor 96 to prevent excessive current flow and also to provide a voltage test point at the collector electrode. It should be clearly understood that those skilled in the art may vary the arrangements of the amplifying circuit in many respect while still obtaining the advantages of the invention.

The terminals of a tertiary winding 99 on transformer 38 according to the invention are directly connected to the emitter electrodes of the input transistors 55 and 56 across the biasing resistance elements formed by the potentiometer resistance strip 57 as divided by the arm 58 of the potentiometer.

In operation, normal mode signal voltage from a suitable transducer (not shown) is applied at the input terminals 11 and 12. In practice an interfering common mode voltage probably will be introduced between the input terminal 12 and the ground terminal 32 across a common mode leakage impedance component, essentially resistance and capacitance in parallel, which unavoidably probably will exist between the floating terminal 42 and the circuit ground terminal 32.

The semiconductor switching devices 45 and 48, are driven by a suitable switching potential applied at the driving terminals 51 and 53 of frequency at least twice that of the variations to be measured and of suitable shape, preferably a square wave to connect input terminal 11 to input terminal 61 and to connect input terminal 62 to the reference potential conductor 43 by effecting very low impedance paths between the contact electrodes of the transistors 45 and 46. The other switching transistors 47 and 48 are held open by complementary driving potential applied at the driving terminals 52 and 53. It should be clearly understood that alternatively terminals 51 and 52 may be connected to the terminals of a secondary winding of a transformer having drive potential applied to the primary winding. With this arrangement, automatic balancing of drive signal is achieved together with necessary isolation so that the driving circuit may be returned to a point of circuit ground such as terminal 32. The latter is especially advantageous because the same drive voltage is desirably applied to a demodulator in the subsequent circuitry of the overall system following the output terminals 21 and 22. In this manner, the base of one input transistor 56 is at reference potential and the base of the other input transistor 55 is at full signal voltage on the initial half cycle of driving voltage. On the ultimate half of the driving voltage cycle the input terminal 11 is connected to the amplifier input terminal 26 by way of the other signal connecting transistor 47 and the amplifier input terminal which is now isolated from the signal input terminal by high impedance between the contact electrodes of the transistor 45 is connected through another transistor 48 to the reference level potential conductor 43. Thus, the balanced input terminals 61 and 62 of the differential amplifying circuit 36 are alternated across the signal voltage terminals thus giving the advantages of positive and negative signal amplification associated with a differential amplifier, and also maintaining an unbroken reference potential level conductor 43 between the input terminals 12 and all of the other reference potential points of the data acquisition amplifier circuit. The conductor 43 is of sufficient low impedance to bring the terminals 12, 42 and 63 to substantially the same identical voltage.

Better bias stability for the input stage and subsequent stages of the amplifying circuit 36 is afforded by the transistor 59 interposed in the emitter return circuit lead of the input stage 50 as a constant current source.

The operation of the amplifier is stabilized by the connection of the tertiary winding 99 across the emitter biasing resistance elements at the emitter electrodes of transistors 55 and 56. This simple, but effective, connection provides full negative feed back voltage to the transistor 55 or 56 operating at signal level since the other terminal of the transformer tertiary winding 99 is at substantially reference potential of the conductor 43 through the low impedances of the other input transistor 56 or 55 and the switching transistor 48 or 46.

While the invention has been shown and described particularly with reference to a preferred embodiment thereof, and various alternates have been suggested, it should be clearly understood that those skilled in the art may effect further changes without departing from the spirit and scope of the invention as defined hereinafter.

The invention claimed is:
1. A data acquisition amplifier including:
input terminals,
output terminals electrically isolated from said input terminals,
a transformer having a primary winding, a secondary winding with terminals individually connected to said output terminals, and a tertiary winding,
a differential amplifying circuit having a reference voltage terminal, a pair of signal terminals balanced with respect to said reference voltage terminal, and output terminals connected to the terminals of the primary winding of said transformer,
a signal stabilizing switching circuit connecting said input terminals cyclically and alternately to the balanced signal terminals of said amplifier circuit and having driving voltage terminals,
said switching circuit comprising four transistors each having one control electrode and two contact electrodes, with the control electrodes coupled to said driving voltage terminals and the contact electrodes arranged cyclically to connect one of said input terminals to one of the signal terminals of said amplifying circuit and to connect the other of said input terminals to said other signal terminal of said amplifying circuit and cyclically to invert said connections,
a continuous galvanic electric connection between one of said input terminals and one terminal of said primary winding for establishing a point of reference potential for all circuits of said amplifier,
said differential amplifying circuit comprising a pair of input transistors having emitter electrodes biased by means including resistive elements,
the terminals of said tertiary winding of said transformer being individually connected to said emitter electrodes and across said resistive elements in negative feedback relationship,
said differential amplifying circuit comprising pairs of interstage amplifying transistors of like conductivity type and a pair of output transistors of opposing conductivity types, and
an emitter follower circuit interposed in said amplifier circuit and having a transistor with an input base electrode connected to one of said output transistors, a collector electrode, and an emitter electrode connected to the other one of said terminals of said transformer primary winding.

2. A data acquisition amplifier including:
input terminals,
output terminals,
an isolating transformer having a primary winding, and a secondary winding with terminals individual connected to said output terminals,
an amplifying circuit having a pair of signal terminals, and output terminals connected to the terminals of the primary winding of said transformer,
a signal switching circuit individually connecting each of said input terminals cyclically and alternately to each of the signal terminals of said amplifying circuit, and
a continuous galvanic electric connection between one of said input terminals and one terminal of said primary winding for establishing a point of reference potential electrically isolated from said output terminals.

3. A data acquisition amplifier including:
input terminals,
output terminals,
a differential amplifier circuit having a pair of signal terminals, and a pair of output leads coupled to said output terminals, and
a signal switching circuit individually connecting each of said input terminals cyclically and alternately to each of the signal terminals of said amplifying circuit.

4. A data acquisition amplifier including:
input terminals,
output terminals,
a transformer having a primary winding, and a secondary winding with terminals individually connected to said output terminals,
a differential amplifying circuit having a pair of signal terminals, and a pair of output terminals individually connected to the terminals of the primary winding of said transformer, and
a signal switching circuit individually connecting each of said input terminals cyclically and alternately to each of the signal terminals of said amplifying circuit.

5. A data acquisition amplifier including:
input terminals,
output terminals,
a transformer having a primary winding, and a secondary winding with terminals individually connected to said output terminals,
a differential amplifying circuit having a pair of signal terminals, and a pair of output terminals individually connected to the terminals of the primary winding of said transformer,
a continuous galvanic connection between one of said input terminals and one terminal of said primary winding and establishing a point of reference potential, and
a signal switching circuit individually connecting each of said input terminals cyclically and alternately to each of the signal terminals of said amplifying circuit.

6. A data acquisition amplifier including:
input terminals,
output terminals electrically isolated from said input terminals,
a transformer having a primary winding, and a secondary winding with terminals individually connected to said output terminals,
a differential amplifying circuit having a pair of balanced signal terminals, and output terminals connected to the terminals of the primary winding of said transformer,
a switching circuit individually connecting each of said input terminals cyclically and alternately to each of the balanced signal terminals of said amplifier circuit and having driving voltage terminals,
said switching circuit comprising four transistors each having one control electrode and two contact electrodes,
the control electrodes connected in pairs to said driving voltage terminals,
one of the contact electrodes of each of two of said transistors being connected to one of said input terminals and the other of the contact electrodes of the same two transistors being individually connected to one of the signal terminals of said amplifying circuit,
one of the contact electrodes of each of the other two transistors being connected individually to the signal terminals of said amplifying circuit,
the other contact electrodes of the latter two transistors being connected to the other of said input terminals,
thereby cyclically to alternate the connection of the signal terminals of the amplifying circuit to said input terminals.

7. A data acquisition amplifier including:
input terminals,
output terminals electrically isolated from said input terminals,
a transformer having a primary winding, and a secondary winding with terminals individually connected to said output terminals,
a continuous electric current carrying conductor connected between one of said input terminals and one terminal of said primary winding for establishing a point of reference potential for all circuits of said amplifier,
a differential amplifying circuit having a reference voltage terminal connected to said current carrying conductor, a pair of signal terminals balanced with respect to said reference voltage terminal, and output terminals connected to the terminals of the primary winding of said transformer,
a switching circuit connecting said input terminals cyclically and alternately to the balanced signal terminals of said amplifier circuit and having driving voltage terminals,
said switching circuit comprising four transistors each having one control electrode and two contact electrodes,
the control electrodes connected in pairs to said driving voltage terminals,
one of the contact electrodes of each of two of said transistors being connected to the other of said input terminals and the other of the contact electrodes of each of the same two transistors being individually connected to the signal terminals of said amplifying circuit,
one of the contact electrodes of each of the other two transistors being connected individually to the signal terminals of said amplifying circuit,
the other contact electrode of the latter two transistors being connected to said reference current carrying conductor,
thereby cyclically to alternate the connection of the balanced signal terminals of the amplifying circuit to said input terminals.

8. A data acquisition amplifier including:
input terminals,
output terminals,
a differential amplifier circuit having:
    a pair of signal terminals and
    a pair of output leads coupled to said output terminals, and
    a signal switching circuit comprising:
        switching devices for first interconnecting a given input terminal and a given signal terminal while also interconnecting the other signal terminal and the other input terminal and for thereafter interconnecting said given signal terminal and said other input terminal while also interconnecting the remaining signal terminal and the remaining input terminal.

References Cited

UNITED STATES PATENTS

| | | | |
|---|---|---|---|
| 2,931,985 | 5/1960 | Offner | 330—10 |
| 3,210,668 | 10/1965 | Stull | 328—101 |

ROY LAKE, *Primary Examiner.*

E. C. FOLSOM, *Assistant Examiner.*